United States Patent
Wang et al.

(10) Patent No.: US 9,778,367 B2
(45) Date of Patent: Oct. 3, 2017

(54) ANTI-JAMMING APPARATUS AND METHOD FOR COMPACT ARRAY ANTENNA

(71) Applicant: ELECTRONICS AND TELECOMMUNICATIONS RESEARCH INSTITUTE, Daejeon (KR)

(72) Inventors: Jinchun Wang, Daejeon (KR); Dae Heon Lee, Daejeon (KR); Dong Hoon Shin, Daejeon (KR); Woong Hee Kim, Changwon-si (KR); Hae Yong Yang, Daejeon (KR); Eungki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 590 days.

(21) Appl. No.: 14/284,955

(22) Filed: May 22, 2014

(65) Prior Publication Data

US 2014/0375500 A1 Dec. 25, 2014

(30) Foreign Application Priority Data

May 30, 2013 (KR) .................. 10-2013-0061786
Feb. 24, 2014 (KR) .................. 10-2014-0021112

(51) Int. Cl.
*G01S 19/21* (2010.01)
*G01S 19/36* (2010.01)

(52) U.S. Cl.
CPC ............ *G01S 19/21* (2013.01); *G01S 19/36* (2013.01)

(58) Field of Classification Search
CPC ................................ G01S 19/21; G01S 19/36
(Continued)

(56) References Cited

U.S. PATENT DOCUMENTS 5,343,211 A * 8/1994 Kott .................. H01Q 3/2611
342/379
6,124,828 A * 9/2000 Champeau .............. G01S 7/36
342/16
(Continued)

FOREIGN PATENT DOCUMENTS

EP    1 130 675 A2    9/2001
JP    11-243359 A     9/1999
(Continued)

*Primary Examiner* — Frank J McGue
(74) *Attorney, Agent, or Firm* — LRK Patent Law Firm (57) ABSTRACT

An anti-jamming apparatus and method for a compact array antenna are provided. The anti-jamming apparatus for a compact array antenna includes a Global Navigation Satellite System (GNSS) array antenna unit including a plurality of GNSS antennas for receiving GNSS signals transmitted from a satellite. A first beam-forming unit includes a plurality of combination units for receiving respective signals received by the plurality of GNSS antennas as a first reference signal and first auxiliary signals and combining the first reference signal with the first auxiliary signals, thus forming different beams. A second beam-forming unit receives signals of the different beams, and combining the signals of the different beams, thus forming an anti-jamming beam in which an invisible area is minimized.

14 Claims, 8 Drawing Sheets

(58) Field of Classification Search
USPC .................................................. 342/357.59
See application file for complete search history.

(56) References Cited

U.S. PATENT DOCUMENTS

| | | | |
|---|---|---|---|
| 6,704,557 | B1 | 3/2004 | Krishnamurthy et al. |
| 6,980,614 | B2 * | 12/2005 | Miller .................. H01Q 3/2605 |
| | | | 375/346 |
| 8,035,562 | B2 * | 10/2011 | Chang ..................... G01S 19/21 |
| | | | 342/357.59 |
| 2001/0020918 | A1 | 9/2001 | Takai |

FOREIGN PATENT DOCUMENTS

| | | |
|---|---|---|
| JP | 2001-257521 A | 9/2001 |
| KR | 10-2000-0077064 A | 12/2000 |
| KR | 10-2001-0082084 A | 8/2001 |
| KR | 10-0866565 B1 | 11/2008 |
| KR | 10-1062277 B1 | 9/2011 |
| WO | 2012/105752 A2 | 8/2012 |

* cited by examiner (PRIOR ART)
FIG. 1

| TYPE | SINGLE BEAMFORMER | | | | | | PRESENT INVENTION |
|---|---|---|---|---|---|---|---|
| NUMBER OF ANTENNAS | 2 | 3 | 4 | 5 | 6 | 7 | 3 |
| AVERAGE INVISIBLE AREA (%) | 18.4 | 12.7 | 11.5 | 7.9 | 6.1 | 5.9 | 4.5 |

FIG. 8

ANTI-JAMMING APPARATUS AND METHOD FOR COMPACT ARRAY ANTENNA

CROSS REFERENCE TO RELATED APPLICATION

This application claims the benefit of Korean Patent Application No. 10-2013-0061786 filed on May 30, 2013 and No. 10-2014-0021112 filed on Feb. 24, 2014 which are hereby incorporated by reference in their entirety into this application.

BACKGROUND OF THE INVENTION

1. Technical Field

The present invention relates generally to an anti-jamming apparatus and method for a compact array antenna in a Global Navigation Satellite System (GNSS) anti-jamming system and, more particularly, to an anti-jamming apparatus and method for a compact array antenna, which can prevent a jamming signal and minimize the size of a GNSS signal invisible area while using fewer antenna elements than existing anti-jamming array antenna elements.

2. Description of the Related Art

A Global Navigation Satellite System (GNSS) is a global positioning system in which GNSS signals transmitted from a satellite are received on a ground, and the location, velocity, and time information of a receiver can be obtained. In order to receive GNSS signals and obtain location and time information, a receiver must receive GNSS signals from four or more satellites. For this, satellites that transmit GNSS signals are designed such that four or more satellites are simultaneously present in a visible area all over the world.

Meanwhile, since GNSS satellites transmit GNSS signals at a power of about 25 watts at an altitude of 20,000 km, the GNSS signals received on the ground are very weak. Due to this, GNSS signals are vulnerable to radio interference, and the reception of GNSS signals may be easily interfered with even by radio interference of low power.

Korean Patent No. 0866565 or the like discloses a scheme for spatially preventing a jamming signal using an array antenna as one of conventional technologies corresponding to GNSS jamming. In anti-jamming technology using an array antenna, jamming is prevented using a method of forming nulls in the direction of a jamming signal and forming beams in the direction of satellite signals via a beam-forming technique for adjusting the reception pattern of the array antenna.

If a weight of a complex number is applied to a signal, the magnitude and the phase of the signal may be changed. An array antenna beamformer for GNSS anti jamming controls beam patterns in such a way as to apply complex number-type weights to the signals of the array antenna, add the resulting signals, and form nulls and beams. In this case, a power minimization or power inversion technique is most widely used to calculate weights of respective antenna signals. This technique is advantageous in that preliminary information about the direction of GNSS satellite signals is not required so as to form beams.

Meanwhile, jamming signal prevention (anti-jamming) using the control of beam patterns causes a satellite-invisible area in which it is impossible for a receiver to receive satellite signals depending on the location of the GNSS satellite due to the shapes of nulls and beams that are generated. The satellite-invisible area is determined by beam patterns changed depending on the intensity and location of the jamming signal, and such a beam pattern is also changed by the structure of the array antenna and the number of antenna elements constituting the array antenna.

In a GNSS anti-jamming system using an array antenna, as the number of antenna elements increases, a beam (or a null) having a narrow beam (or null) width can be formed, and thus there is the advantage of securing a wide visible area.

Meanwhile, as the number of antenna elements increases, the dimension of a cross-covariance matrix that must be obtained to form a beam (or a null) is raised, so that an increase in power consumption required to operate a large number of elements, together with an increase in a computational load, are highlighted as disadvantages. Typically, it is known that an anti-jamming array antenna for military purposes has 6 to 7 antenna elements.

Therefore, in order to solve these disadvantages, an anti-jamming apparatus and method for a compact array antenna which can prevent a jamming signal using a small number of antenna elements and minimize the size of a GNSS signal invisible area are urgently required.

SUMMARY OF THE INVENTION

Accordingly, the present invention has been made keeping in mind the above problems occurring in the prior art, and an object of the present invention is to effectively null a jamming signal based on beam forming using an array antenna having a small number of antenna elements in a GNSS reception system vulnerable to radio interference jamming.

Another object of the present invention is to provide an anti-jamming apparatus and method for a compact array antenna, which can minimize the size of an invisible area.

A further object of the present invention is to improve power efficiency compared to an existing array antenna system by using a compact array antenna while minimizing the size of an invisible area for GNSS signals regardless of whether jamming has occurred.

In accordance with an aspect of the present invention to accomplish the above objects, there is provided an anti-jamming apparatus for a compact array antenna, including a Global Navigation Satellite System (GNSS) array antenna unit including a plurality of GNSS antennas for receiving GNSS signals transmitted from a satellite, a first beam-forming unit including a plurality of combination units for receiving respective signals received by the plurality of GNSS antennas as a first reference signal and first auxiliary signals and combining the first reference signal with the first auxiliary signals, thus forming different beams, and a second beam-forming unit for receiving signals of the different beams, and combining the signals of the different beams, thus forming an anti-jamming beam in which an invisible area is minimized.

Preferably, the first beam-forming unit may include an allocation unit for allocating different first reference signals to the plurality of combination units.

Preferably, the combination units may assign different weights to the first reference signal and the first auxiliary signals using a power minimization technique and combine resulting signals.

Preferably, the weights of the first auxiliary signals may be values for minimizing energy of error between combinations of the first reference signal and the first auxiliary signals.

Preferably, the combination units may form identical nulls so as to eliminate an identical jamming signal.

Preferably, the combination units may form the beams for which invisible areas that are areas incapable of receiving GNSS signals transmitted from the satellite are different from each other.

Preferably, the second beam-forming unit may overlay a beam pattern by combining the signals of the different beams.

Preferably, the invisible area of the anti-jamming beam may be an invisible area formed in common by the combination units.

Preferably, a gain of the anti-jamming beam may be a value obtained by overlapping gains formed by the combination units.

Preferably, a number of the combination units may correspond to a number of GNSS antennas.

In accordance with another aspect of the present invention to accomplish the above objects, there is provided an anti-jamming method for a compact array antenna, including receiving Global Navigation Satellite System (GNSS) signals transmitted from a satellite through a plurality of GNSS antennas, receiving respective signals received by the plurality of GNSS antennas as a first reference signal and first auxiliary signals and combining the first reference signal with the first auxiliary signals, thus forming different beams, and receiving signals of the different beams, and combining the signals of the different beams, thus forming an anti-jamming beam in which an invisible area is minimized.

Preferably, forming the different beams may include allocating different first reference signals.

Preferably, forming the different beams may be configured to assign different weights to the first reference signal and the first auxiliary signals using a power minimization technique and combine resulting signals.

Preferably, the weights of the first auxiliary signals may be values for minimizing energy of error between combinations of the first reference signal and the first auxiliary signals.

Preferably, forming the different beams may be configured to identical nulls so as to eliminate an identical jamming signal.

Preferably, forming the different beams may be configured to form the beams for which invisible areas that are areas incapable of receiving GNSS signals transmitted from the satellite are different from each other.

Preferably, forming the anti-jamming beam may be configured to overlay a beam pattern by combining the signals of the different beams.

Preferably, the invisible area of the anti-jamming beam may be an invisible area formed in common by the different beams.

Preferably, a gain of the anti-jamming beam may be a value obtained by overlapping gains formed by the different beams.

Preferably, a number of the different beams may correspond to a number of GNSS antennas.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Figure 1:
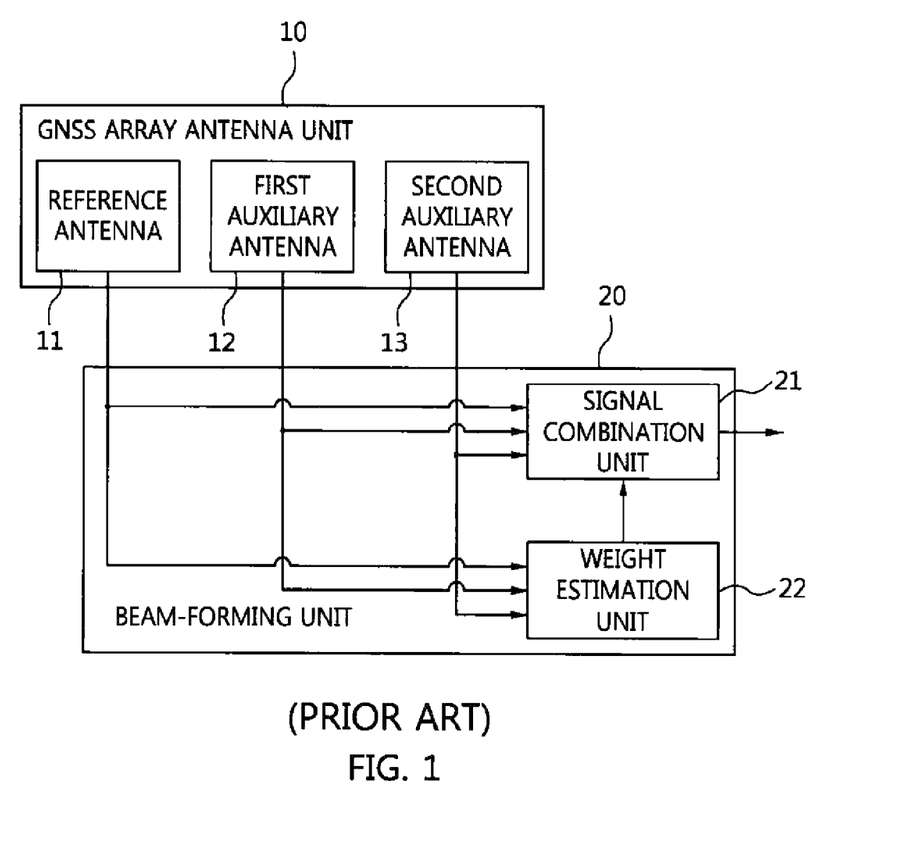
FIG. 1 is a block diagram showing the configuration and operation of a singe beamformer contrasted with the present invention.

Hereinafter, the configuration and operation of a single beamformer contrasted with the present invention will be described. FIG. 1 is a block diagram showing the configuration and operation of a single beamformer contrasted with the present invention.

Referring to FIG. 1, the single beamformer includes a Global Navigation Satellite System (GNSS) array antenna unit 10 and a beam-forming unit 20, which includes a signal combination unit 21 and a weight estimation unit 22.

The GNSS array antenna unit 10 includes a reference antenna 11, a first auxiliary antenna 12, and a second auxiliary antenna 13.

The weight estimation unit 22 estimates weights of respective antenna signals from signals received by the GNSS array antenna unit. The weights are values required to minimize energy of error between a signal received by the reference antenna 11 and a combination of the signals received by the first auxiliary antenna 12 and the second auxiliary antenna 13. Consequently, a jamming signal included in the GNSS signal received by the reference antenna 11 is estimated to be the sum of combinations of the signals received by the first auxiliary antenna 12 and the second auxiliary antenna 13 and the weights of the signals. Further, the estimated jamming signal is eliminated by subtracting the jamming signal from the signal received by the reference antenna 11. Meanwhile, the above procedure is a procedure for forming a null in a direction in which the jamming signal is present and for eliminating the jamming signal from the standpoint of the beam pattern of the antenna.

However, the above-described jamming signal elimination technique for power minimization causes a satellite-invisible area in which GNSS signals cannot be received depending on the characteristics of generated nulls. In this case, the term "satellite-invisible area" denotes an area in which a gain is low in beam patterns of the entire array antenna and thus satellite signals cannot be received. The satellite-invisible area is increased as the width of a null is widened, and is decreased only when a beam pattern gain is uniformly maintained at a specific value or more in the area other than the null. Meanwhile, as the number of array antenna elements is increased, the width of the null that can be generated by the array antenna is narrowed, and the probability of the beam pattern gain being uniformly maintained at a specific value or more is increased.

For this reason, in order to minimize the satellite-invisible area while eliminating a jamming signal via nulling, the number of antenna elements constituting the array antenna must be increased. However, an increase in the number of antenna elements may be the cause of increasing the complexity and cost of implementation of the entire system.

Figure 2:
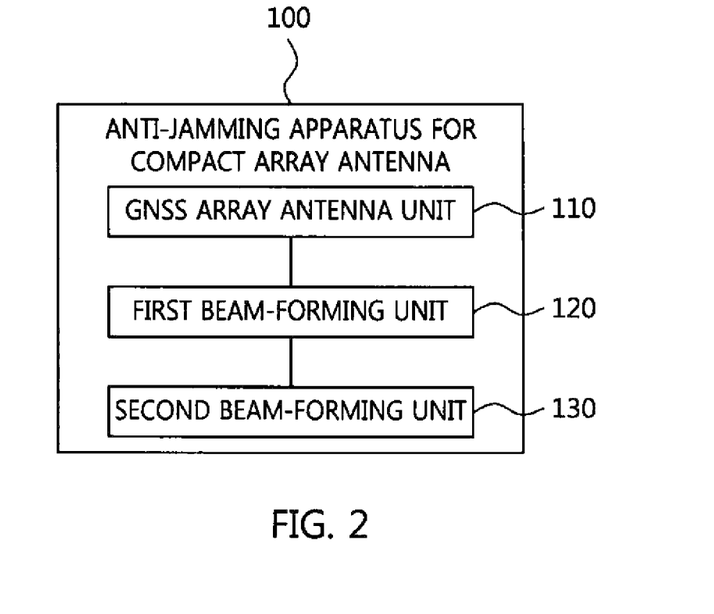
FIG. 2 is a block diagram showing an anti-jamming apparatus for a compact array antenna according to the present invention.
Figure 3:
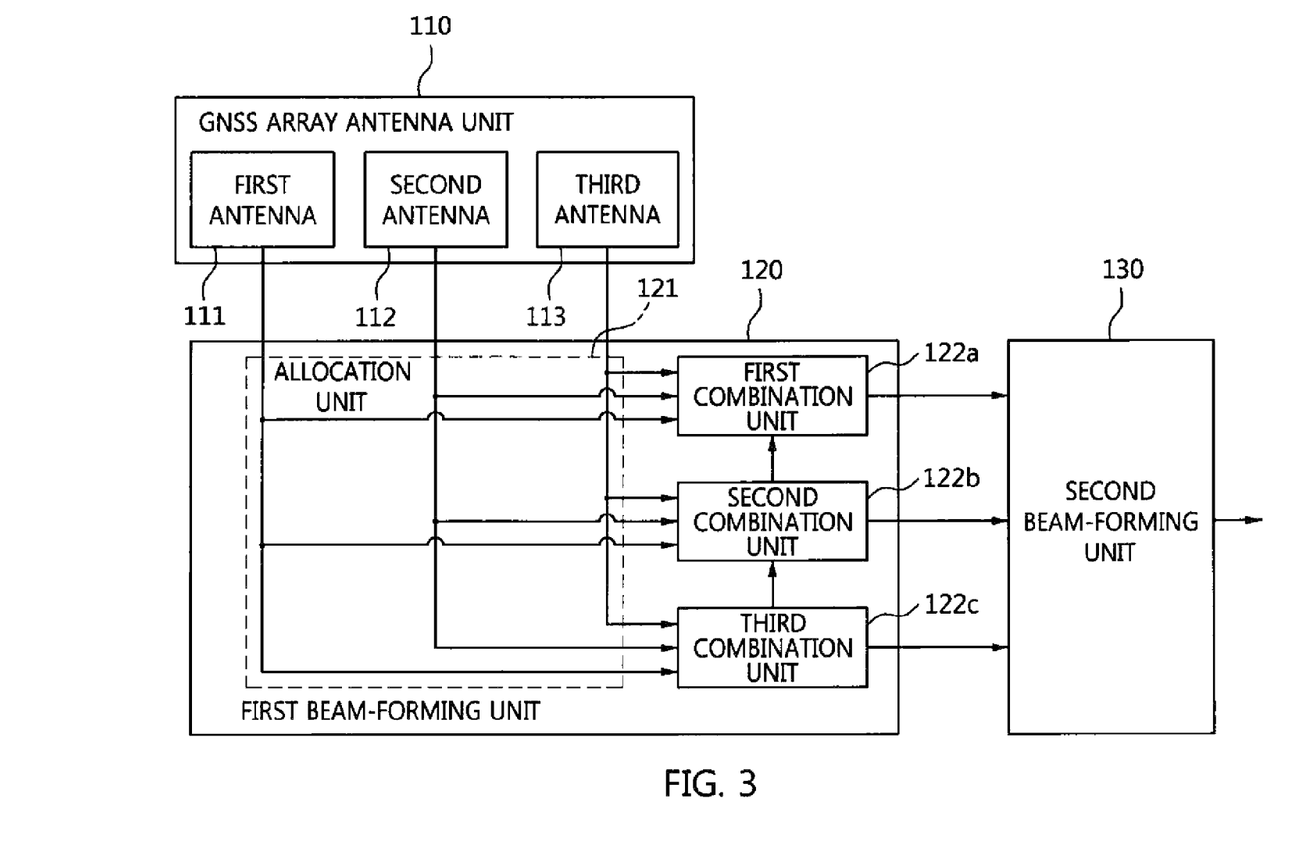
FIG. 3 is a diagram showing an embodiment of the anti-jamming apparatus for a compact array antenna according to the present invention.
Figure 4:
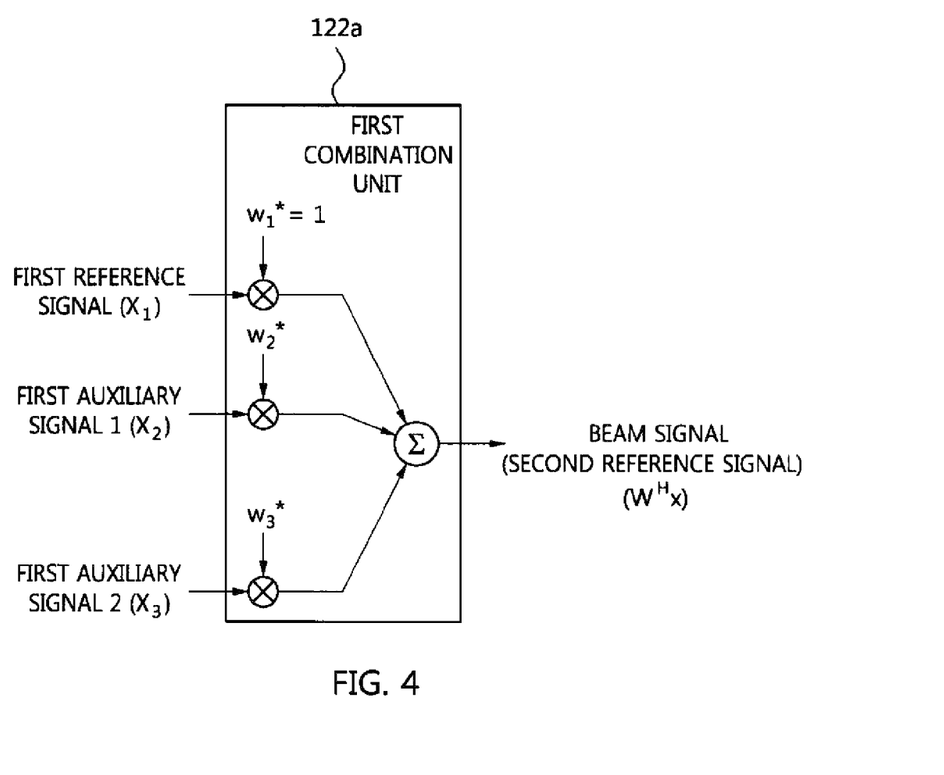
FIG. 4 to FIG. 6 are diagrams showing an example in which a first beam forming unit combines signals.
Figure 5:
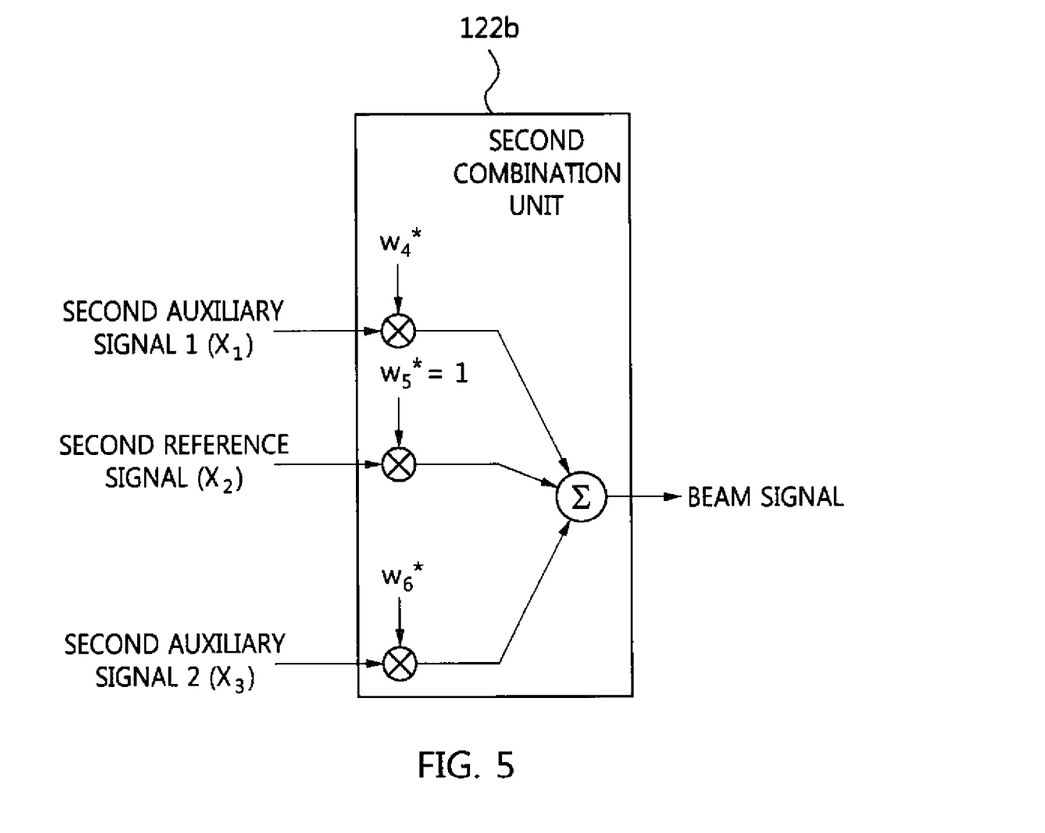
Figure 6:
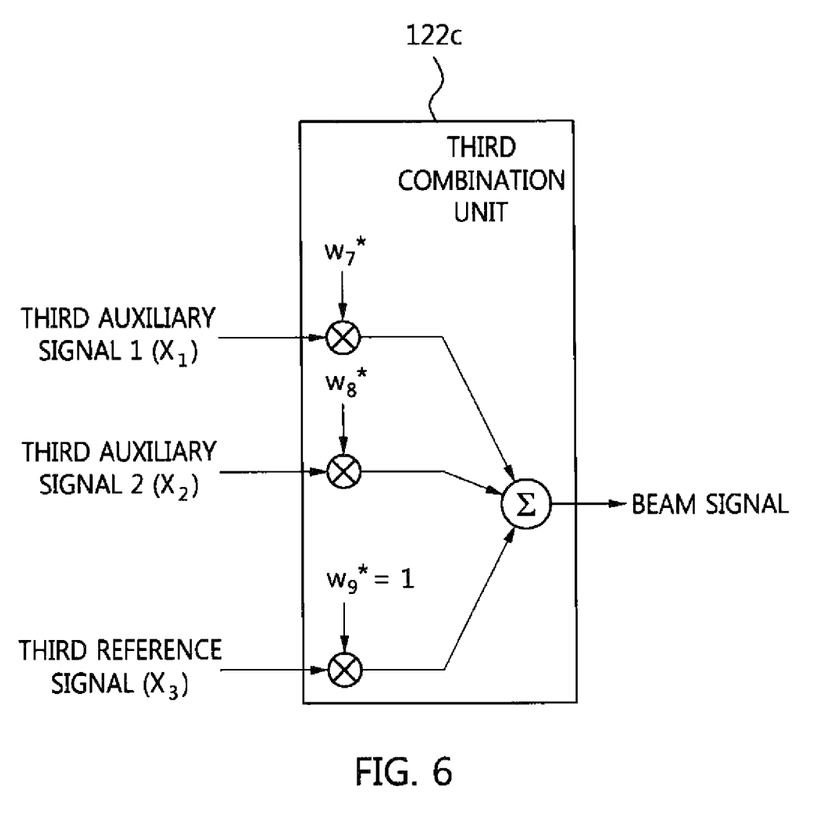

Therefore, an anti-jamming apparatus for a compact array antenna according to the present invention which overcomes the aforementioned disadvantage will be described below. FIG. 2 is a block diagram showing an anti-jamming apparatus for a compact array antenna according to the present invention. FIG. 3 is a diagram showing an embodiment of the anti-jamming apparatus for a compact array antenna according to the present invention. FIG. 4 to FIG. 6 are diagrams showing an example in which a first beam-forming unit combines signals.

Referring to FIGS. 2 and 3, an anti-jamming apparatus 100 for a compact array antenna according to the present invention includes a Global Navigation Satellite System (GNSS) array antenna unit 110, a first beam-forming unit 120, and a second beam-forming unit 130. The GNSS array antenna unit 110 includes plurality of GNSS antennas for receiving GNSS signals transmitted from a satellite. The first beam-forming unit 120 includes a plurality of combination units 122a, 122b, and 122c for receiving the plurality of GNSS signals received by the respective GNSS antennas as a first reference signal and first auxiliary signals and combining the signals with each other, thus forming different beams. The second beam-forming unit 130 receives signals of the different beams, and combining the signals of the different beams, thus forming an anti-jamming beam in which an invisible area is minimized.

Referring continuously to FIG. 3, an embodiment of the present invention will be described. The GNSS array antenna unit 110 includes a first antenna 111, a second antenna 112, and a third antenna 113. That is, the GNSS array antenna unit 110 includes a plurality of GNSS antennas 111, 112, and 113. Compared to the typical number (6 or 7) of GNSS array antennas, the antenna unit 110 includes a smaller number of antennas.

In order to prevent a jamming signal and minimize the GNSS signal invisible area while using a smaller number of antenna elements in accordance with the objects of the present invention, a dual beam-forming unit composed of the first beam-forming unit 120 and the second beam-forming unit 130 is required.

The first beam-forming unit 120 includes the first combination unit 122a, the second combination unit 122b, and the third combination unit 122c. That is, a plurality of combination units are present in the first beam-forming unit 120.

Here, the number of combination units 122a, 122b, and 122c may correspond to the number of the plurality of GNSS antennas. For example, when the number of GNSS antennas is 4, it is preferable that the number of combination units be 4.

In this case, the first combination unit 122a allocates a signal received by the first antenna 111 of the GNSS array antenna unit 110 as a first reference signal, allocates a signal received by the second antenna 112 of the GNSS array antenna unit 110 as a first auxiliary signal, and also allocates a signal received by the third antenna 113 of the GNSS array antenna unit 110 as a first auxiliary signal. That is, a signal received by any one antenna is allocated as a first reference signal, and signals received by the remaining antennas are allocated as first auxiliary signals.

The first beam-forming unit may include an allocation unit 121 for allocating different first reference signals to the plurality of combination units. That is, the allocation unit 121 functions to set a signal received by a specific one of the plurality of antennas to the first reference signal. The above-described allocation unit 121 is not configured independently of the combination units 122a, 122b, and 122c and may also be provided within each of the combination units. Referring to FIGS. 4, 5, 6 a N-combination unit designating N-antenna as reference antenna 122a, 122b, 122c assign different weights to the first reference signal and to the first auxiliary signals and combines respective resulting values. In detail, a value of 1 is assigned as a weight $w_1$, $w_5$, $w_9$ to the first reference signal, and weights of the first auxiliary signals are assigned in consideration of the following Equation (1):

$$W_{aN} = R_{aN}^{-1} p_{aN} \quad (1)$$

Where $W_{aN} = [W_1, \ldots, W_K | \text{except } W_N]^T$ denotes a weight vector of the first auxiliary signals of the N-combination unit and $R_{aN} = E\{X_{aN} X_{aN}^H\}$ denotes a cross-covariance matrix of the first auxiliary signals of the N-combination unit. Here, T denotes the transpose of a matrix and H represents the conjugate transpose. Further, $p_{aN} = E\{X_{aN} X_N^*\}$ denotes a cross-covariance vector between the first reference signal and the first auxiliary signals of the N-combination unit, and $X_N$ denotes a first reference signal and $X_{aN} = [X_1, \ldots, X_K | \text{except } X_N]^T$ denotes an first auxiliary signal vector of the N-combination unit. Further, $E\{\ \}$ denotes an expected value. K denotes the number of the antenna elements.

The weights of the first auxiliary signals are values for minimizing the energy of error between combinations of the first reference signal and the first auxiliary signals. Consequently, a jamming signal included in the first reference signal is estimated to be the sum of combinations of the first auxiliary signals and the weights of the signals, and such a jamming signal is subtracted from the first reference signal and is thus eliminated. Meanwhile, the above procedure is a procedure for forming a null in a direction in which the jamming signal is present and for eliminating the jamming signal from the standpoint of the beam pattern of the antenna.

The second beam-forming unit 130 receives different beams formed by the first beam-forming unit 120 and combines the different beams, thus forming an anti-jamming beam for which an invisible area is minimized. The second beam-forming unit assigns weights by normalizing the weights of the first auxiliary signals and combines different beams formed by the first beam-forming unit 120.

That is, the weights assigned by the first beam-forming unit 120 are calculated using a power minimization technique, and the weights assigned by the second beam-forming unit 130 are calculated by normalizing the weights assigned by the first beam-forming unit and are assigned by specifically considering the following Equation (2):

$$w = \begin{bmatrix} \dfrac{1 + w_{a2}(1) + w_{a3}(1)}{\|1 + w_{a2}(1) + w_{a3}(1)\|} \\ \dfrac{w_{a1}(1) + 1 + w_{a3}(2)}{\|w_{a1}(1) + 1 + w_{a3}(2)\|} \\ \dfrac{w_{a1}(2) + w_{a2}(2) + 1}{\|w_{a1}(2) + w_{a2}(2) + 1\|} \end{bmatrix} \quad (2)$$

where w denotes weight of the second beam-forming unit, $W_{aN}(k)$ denotes a weight vector of the first auxiliary signal of the N-combination unit calculated by the above Equation (1), and $\|\ \|$ denotes an L2-norm.

If the weights calculated in this way are applied, signal is overlapped by three beam patterns is acquired.

Consequently, the plurality of combination units 122a, 122b, and 122c generate nulls at the same location so as to eliminate the same jamming signal. In this case, beams formed by the respective combination units are different from each other except for the location of the nulls, and thus satellite-invisible areas appear as different areas.

In this case, the second beam-forming unit 120 overlaps beam patterns formed by the combination units 122a, 122b, and 122c of the first beam-forming unit 120 with each other. In the overlapping beam pattern, the location of the nulls present at the same location is maintained and the different gains of the beam patterns overlap to be compensated for.

Therefore, among the invisible areas of the different beams formed by the combination units 122a, 122b, and 122c of the first beam-forming unit 120, only a common area remains as an invisible area.

Figure 7:
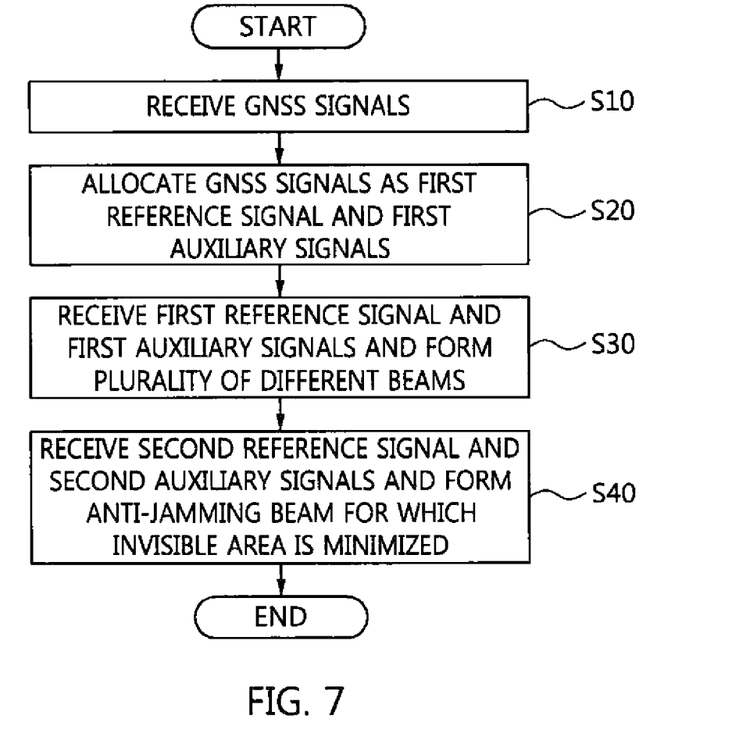
FIG. 7 is a flowchart showing an anti-jamming method for a compact array antenna according to the present invention.

Hereinafter, an anti-jamming method for a compact array antenna according to the present invention will be described in detail. FIG. 7 is a flowchart showing an anti-jamming method for a compact array antenna according to the present invention. FIGS. 4, 5, 6 are diagrams showing an example in which the first beam-forming unit combines signals.

Referring to FIG. 7, the anti-jamming method for a compact array antenna according to the present invention includes the step S10 of receiving GNSS signals transmitted from a satellite through a plurality of GNSS antennas, the step S30 of receiving the respective signals received by the plurality of GNSS antennas as a first reference signal and first auxiliary signals and combining the first reference signal with the first auxiliary signals, thus forming different beams, and the step S40 of receiving signals of the different beams, and combining the signals of the different beams, thus forming an anti-jamming beam in which an invisible area is minimized.

In order to prevent a jamming signal and minimize the GNSS signal invisible area while using a smaller number of antenna elements in accordance with the objects of the present invention, a dual beam-forming step including the step of forming the different beams and the step of forming the anti-jamming beam is required.

At the step of forming the different beams, a signal received by any one antenna at the step of receiving the GNSS signals is allocated as a first reference signal, and signals received by the remaining antennas are allocated as first auxiliary signals. That is, the signal received by any one antenna is allocated as the first reference signal, and all of the signals received by the remaining antennas are allocated as the first auxiliary signals.

In this case, the step S30 of forming the different beams may include the step S20 of allocating different first reference signals.

That is, this step S20 may function to set a signal, received by a specific one of the plurality of antennas, to a first reference signal.

Referring to FIGS. 4, 5, 6 the step S30 of forming the different beams is configured to assign different weights to the first reference signal and the first auxiliary signals, and combine resulting signals with each other. In detail, a value of 1 is assigned as the weight $w_1$ of the first reference signal, and the weights of the first auxiliary signals are assigned in consideration of the following Equation (1):

$$W_{aN} = R_{aN}^{-1} p_{aN} \quad (1)$$

where $W_{aN} = [W_1, \ldots, W_K | \text{except } W_N]^T$ denotes a weight vector of the first auxiliary signals of the N-combination unit and $R_{aN} = E\{X_{aN} X_{aN}^H\}$ denotes a cross-covariance matrix of the first auxiliary signals of the N-combination unit. Here, T denotes the transpose of a matrix and H represents the conjugate transpose. Further, $p_{aN} = E\{X_{aN} X_N^*\}$ denotes a cross-covariance vector between the first reference signal and the first auxiliary signals of the N-combination unit, and $X_N$ denotes a first reference signal and $X_{aN} = [X_1, \ldots, X_K | \text{except } X_N]^T$ denotes an first auxiliary signal vector of the N-combination unit. Further, $E\{\ \}$ denotes an expected value. K denotes the number of the antenna elements.

The weights of the first auxiliary signals are values for minimizing the energy of error between combinations of the first reference signal and the first auxiliary signals. Consequently, a jamming signal included in the first reference signal is estimated to be the sum of combinations of the first auxiliary signals and the weights of the signals, and such a jamming signal is subtracted from the first reference signal and is thus eliminated. Meanwhile, the above procedure is a procedure for forming a null in a direction in which the jamming signal is present and for eliminating the jamming signal from the standpoint of the beam pattern of the antenna.

The step S40 of forming the anti-jamming beam is configured to receive different beams formed at the step S30 of forming the different beams and combine the different beams thus forming an anti-jamming beam for which the invisible area is minimized. The step S40 of forming the anti-jamming beam is configured to assign weights by normalizing the weights of the first auxiliary signals and combine the different beams formed at the step S30 of forming the different beams.

The number of different beams may correspond to the number of GNSS antennas. In detail, if the number of GNSS antennas is four, it is preferable that the number of different beams be four.

In conclusion, the weights assigned at the step S30 of forming the different beams are calculated using a power minimization technique, and the weights assigned at the step S40 of forming the anti-jamming beam are calculated by normalizing the weights assigned at the step S30 of forming the different beams and are assigned by specifically considering the following Equation (2):

$$w = \begin{bmatrix} \dfrac{1 + w_{a2}(1) + w_{a3}(1)}{\|1 + w_{a2}(1) + w_{a3}(1)\|} \\ \dfrac{w_{a1}(1) + 1 + w_{a3}(2)}{\|w_{a1}(1) + 1 + w_{a3}(2)\|} \\ \dfrac{w_{a1}(2) + w_{a2}(2) + 1}{\|w_{a1}(2) + w_{a2}(2) + 1\|} \end{bmatrix} \quad (2)$$

where w denotes weight of the second beam-forming unit, $W_{aN}(k)$ denotes a weight vector of the first auxiliary signal of the N-combination unit calculated by the above Equation (1), and ‖ ‖ denotes an L2-norm.

If the weights calculated in this way are applied, signal is overlapped by three beam patterns is acquired.

Consequently, the respective beams formed at the step S30 of forming the different beams generate nulls at the same location so as to eliminate the same jamming signal. In this case, the respective beams are different from each other except for the location of the nulls, and thus satellite-invisible areas also appear as different areas, respectively.

In this case, at the step S40 of forming the anti-jamming beam, the beam patterns of the different beams formed at the step S30 of forming the different beams overlap each other. In the overlapping beam pattern, the location of the nulls present at the same location is maintained and the different gains of the beam patterns overlap to be compensated for.

Consequently, among the invisible areas of the beams formed at the step S30 of forming the different beams, only a common area remains as an invisible area.

Figure 8:
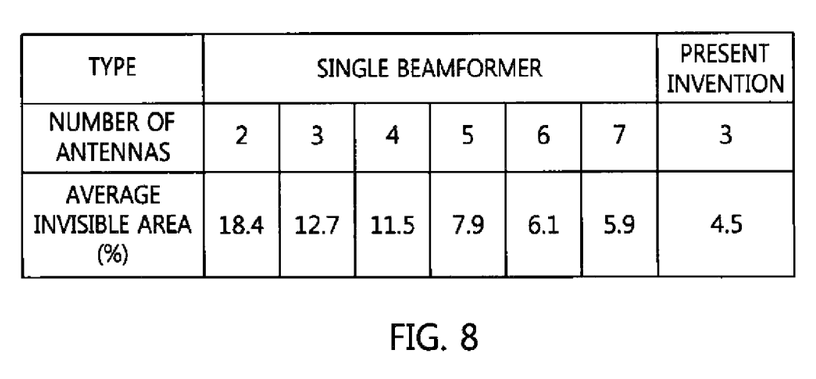
FIG. 8 is a diagram showing results of simulation of the anti-jamming apparatus for a compact array antenna according to the present invention and an existing single beamformer.

Below, the performances of an existing single beamformer and the anti-jamming apparatus for the compact array antenna according to the present invention will be compared with each other. FIG. 8 is a diagram showing the results of simulation of the anti-jamming apparatus for the compact array antenna according to the present invention.

In the present invention, it is preferable to use three array antennas which are circularly arranged and a first beam-forming unit. The reason for this is that, as a result of the simulation, a satellite-invisible area may be minimized using only the three circularly arranged antennas.

Of course, this is only a preferred embodiment, and the present invention is not limited thereto and may extend the number of antenna elements to an arbitrary number.

Referring to FIG. 8, it can be seen that, as a result of a comparison in performance between the single beamformer and the anti-jamming apparatus for the compact array antenna according to the present invention, the size of the invisible area of the anti-jamming apparatus for a compact array antenna according to the present invention in which a smaller number of array antenna elements were used is smaller than that of the existing single beamformer in which seven antenna elements were used.

First, an environment for simulation is given as follows. The respective antenna elements have isotropy and are circularly arranged at intervals of half-wavelength of GNSS signals. When the nulls are generated, a region having an antenna gain of less than −5 dBic in the whole air space (hemispheric region) is set to a satellite-invisible area, and the ratio of the surface area of the satellite-invisible area to the surface area of the hemisphere is indicated by a percentage, and then performance is analyzed.

In accordance with the present invention, a jamming signal can be effectively nulled based on beam forming using an array antenna having a small number of antenna elements in a GNSS reception system vulnerable to radio interference jamming.

Further, in accordance with the present invention, there can be implemented an anti-jamming apparatus and method for a compact array antenna which can minimize the size of an invisible area.

Furthermore, in accordance with the present invention, power efficiency can be improved compared to an existing array antenna system by using a compact array antenna while minimizing the size of an invisible area for GNSS signals regardless of whether jamming has occurred.

As described above, in the anti-jamming apparatus and method for the compact array antenna according to the present invention, the configurations and schemes in the above-described embodiments are not limitedly applied, and some or all of the above embodiments can be selectively combined and configured so that various modifications are possible.

What is claimed is:

1. An anti-jamming apparatus for a compact array antenna, comprising:
   a Global Navigation Satellite System (GNSS) array antenna unit including a plurality of GNSS antennas for receiving GNSS signals transmitted from a satellite;
   a first beam-forming unit including a plurality of combination units for receiving respective signals received by the plurality of GNSS antennas as a first reference signal and first auxiliary signals and combining the first reference signal with the first auxiliary signals, thus forming different beams; and
   a second beam-forming unit for receiving signals of the different beams, and combining the signals of the different beams, thus forming an anti-jamming beam in which a satellite-invisible area is minimized,
   wherein the first beam-forming unit comprises an allocation unit for allocating different first reference signals to the plurality of combination units
   wherein the combination units assign different weights to the first reference signal and the first auxiliary signals using a power minimization technique and combine resulting signals, and
   wherein the weights of the first auxiliary signals are values for minimizing energy of error between combinations of the first reference signal and the first auxiliary signals.

2. The anti-jamming apparatus of claim 1, wherein the plurality of combination units form identical nulls so as to eliminate an identical jamming signal.

3. The anti-jamming apparatus of claim 1, wherein the combination units are configured to form the different beams so that the satellite-invisible areas of the different beams are different from each other.

4. The anti-jamming apparatus of claim 1, wherein the second beam-forming unit overlays a beam pattern by combining the signals of the different beams.

5. The anti-jamming apparatus of claim 1, wherein the satellite-invisible area of the anti-jamming beam is a satellite-invisible area formed in common by the combination units.

6. The anti-jamming apparatus of claim 1, wherein a gain of the anti-jamming beam is a value obtained by overlapping gains formed by the combination units.

7. The anti-jamming apparatus of claim 1, wherein a number of the combination units corresponds to a number of GNSS antennas.

8. An anti-jamming method for a compact array antenna, comprising:
   receiving Global Navigation Satellite System (GNSS) signals transmitted from a satellite through a plurality of GNSS antennas;
   receiving respective signals received by the plurality of GNSS antennas as a first reference signal and first auxiliary signals and combining the first reference signal with the first auxiliary signals, thus forming different beams; and receiving signals of the different beams, and combining the signals of the different beams, thus forming an anti-jamming beam in which a satellite-invisible area is minimized, wherein forming the different beams comprises allocating different first reference signals, wherein forming the different beams is configured to assign different weights to the first reference signal and the first auxiliary signals using a power minimization technique and combine resulting signals, and wherein the weights of the first auxiliary signals are values for minimizing energy of error between combinations of the first reference signal and the first auxiliary signals.

9. The anti-jamming method of claim 8, wherein forming the different beams comprises forming the different beams so that the different beams have identical nulls so as to eliminate an identical jamming signal.

10. The anti-jamming method of claim 8, wherein forming the different beams comprises forming the different beams so that the different beams have satellite-invisible areas that are different from each other.

11. The anti-jamming method of claim 8, wherein forming the anti-jamming beam comprises overlaying a beam pattern by combining the signals of the different beams.

12. The anti-jamming method of claim 8, wherein the satellite-invisible area of the anti-jamming beam is a satellite-invisible area formed in common by the different beams.

13. The anti-jamming method of claim 8, wherein a gain of the anti-jamming beam is a value obtained by overlapping gains formed by the different beams.

14. The anti-jamming method of claim 8, wherein a number of the different beams corresponds to a number of GNSS antennas.

* * * * *